US008792486B2

(12) United States Patent
Hansen et al.

(10) Patent No.: US 8,792,486 B2
(45) Date of Patent: Jul. 29, 2014

(54) PACKET ROUTING WITHIN SERVER DEVICE ENCLOSURE

(75) Inventors: Peter Hansen, Cypress, TX (US); Ronald M. Urwin, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 319 days.

(21) Appl. No.: 13/223,253

(22) Filed: Aug. 31, 2011

(65) Prior Publication Data
US 2013/0051395 A1    Feb. 28, 2013

(51) Int. Cl.
*H04L 12/28* (2006.01)
*H04J 1/16* (2006.01)

(52) U.S. Cl.
USPC ............................ 370/386; 370/252; 370/389

(58) Field of Classification Search
USPC .......................................... 370/252, 389, 386
See application file for complete search history.

(56) References Cited

U.S. PATENT DOCUMENTS

| 7,424,710 | B1 | 9/2008 | Nelson et al. | |
| 7,515,596 | B2 | 4/2009 | Tripathi et al. | |
| 7,761,578 | B2 | 7/2010 | Henry et al. | |
| 2005/0240745 | A1* | 10/2005 | Iyer et al. | 711/167 |
| 2010/0014459 | A1* | 1/2010 | Mir et al. | 370/328 |
| 2011/0004876 | A1 | 1/2011 | Wu et al. | |
| 2011/0004877 | A1 | 1/2011 | Wu | |
| 2011/0310839 | A1* | 12/2011 | Kenington et al. | 370/331 |
| 2012/0113841 | A1* | 5/2012 | Todd et al. | 370/252 |
| 2013/0094452 | A1* | 4/2013 | Pavlovski et al. | 370/329 |

\* cited by examiner

*Primary Examiner* — John Pezzlo

(57) ABSTRACT

An enclosure is associated with a network address. A management processor of a server device within the enclosure and an enclosure processor of a management mechanism within the enclosure share the network address. A networking switch processor of a networking switch within the enclosure is to route the packet to the enclosure processor, or directly to the management processor without the packet passing through the management mechanism.

15 Claims, 4 Drawing Sheets

PACKET ROUTING WITHIN SERVER DEVICE ENCLOSURE

BACKGROUND

For space, power, ease-of-management, and other considerations, a number of server devices may be grouped together within a common enclosure, or chassis. For instance, the enclosure may have slots into which corresponding server "blades" can be inserted. Each server blade is its own server device, including at least its own processor, memory, and so on. The server devices may be commonly managed via external communication with a management mechanism, or module, of the enclosure.

DETAILED DESCRIPTION

As noted in the background section, a number of server devices may be housed within a common enclosure in which a management mechanism for managing the server devices is also located. Communication with the server devices is typically achieved through the management mechanism. This approach works well for low-bandwidth communication: an external device communicating with the chassis communicates with the individual server devices by such communication passing through the management mechanism.

However, for high-bandwidth communication, the management mechanism has proven to be a bottleneck. An example of such high-bandwidth communication relates to virtualized devices. The external device communicating with the chassis may instantiate a virtualized display device of a server device within the chassis, within a virtual device session. As another example, a server device within the chassis may instantiate a virtualized storage device that virtualizes an actual physical storage device, such as an optical disc device, which is connected to or that is part of the external device, within a different virtual device session.

Existing solutions to this problem are disadvantageous. The management mechanism may be provided with a faster processor and other resources so that it is less of a bottleneck. However, this solution is expensive, and does not scale well. In particular, fast processors can be expensive, and even the fastest processors may not completely alleviate the bottleneck.

Furthermore, rather than having a network address associated with the enclosure that is shared by an enclosure processor of the management mechanism and by a management processor of each server device, the management processor of each server device may have its own network address, such as its own Internet Protocol (IP) layer-three network address. However, this solution is disadvantageous from a management perspective. In particular, a network administrator now has to manage separate and different IP layer-three network addresses for the server devices of the enclosure.

Disclosed herein are techniques for alleviating the bottleneck presented by the management mechanism in ways that avoid these disadvantages. A networking switch processor of a networking switch within an enclosure receives a packet addressed to a network address associated with the enclosure. The networking switch is connected to a server device within the enclosure and to a management mechanism within the enclosure. A management processor of the server device and an enclosure processor of the management mechanism share the network address associated with the enclosure.

In response to determining that the packet pertains to high-bandwidth communication, the networking switch processor directly routes the packet to the management processor without the packet passing through the management mechanism. In response to determining that the packet pertains to low-bandwidth communication, the networking switch processor routes the packet to the enclosure processor. The management mechanism does not present a bottleneck to high-bandwidth communication, as such communication is not routed through the management mechanism, whereas the network address is still shared by both the management and enclosure processors.

Figure 1:
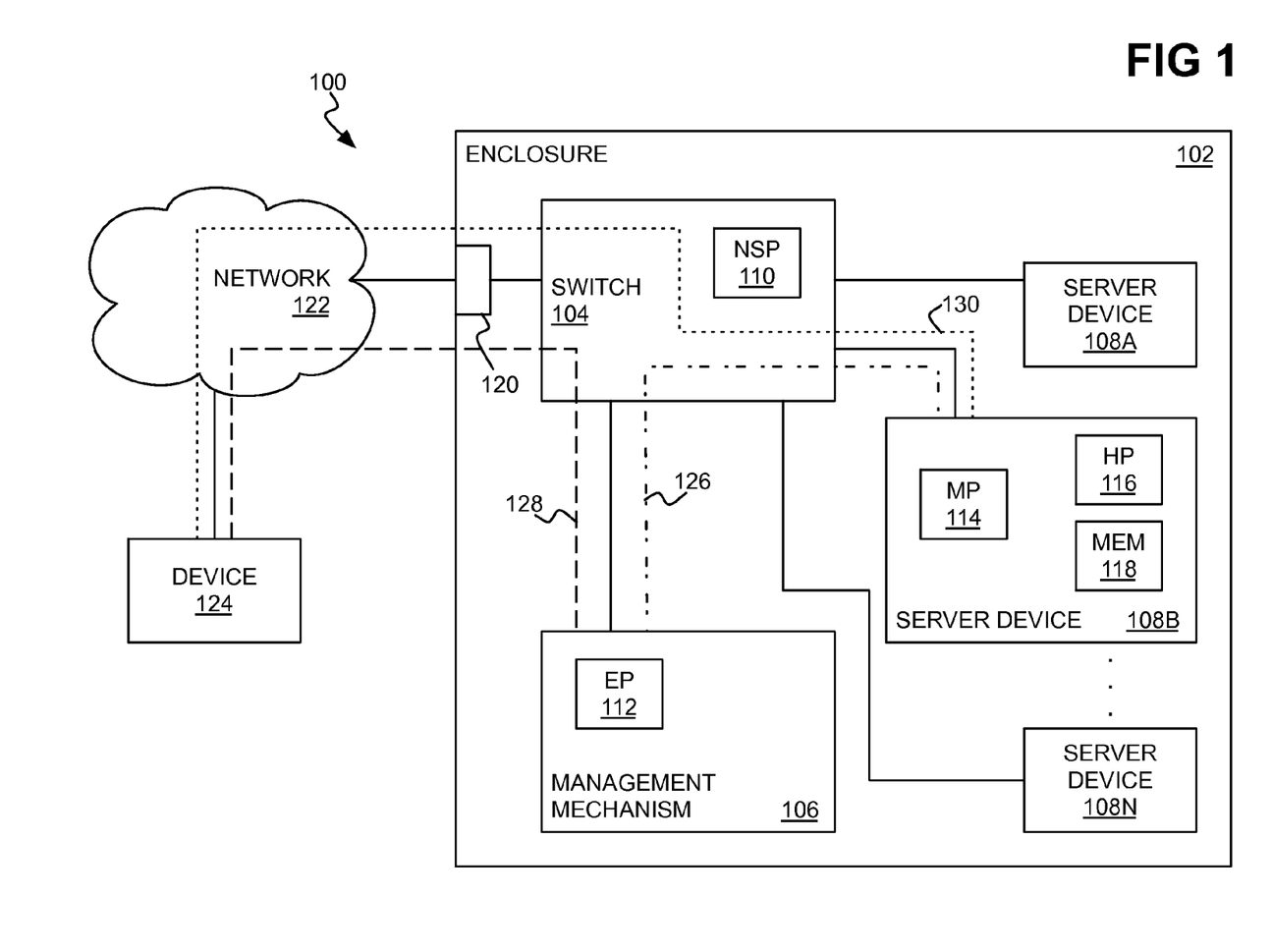
FIG. 1 is a diagram of an example system including an example enclosure having a networking switch, a management mechanism, and one or more server devices.

FIG. 1 shows an example system 100 that includes an example enclosure 102. The enclosure 102 may also be referring to as a housing or a chassis. The enclosure 102 has disposed therein a networking switch 104, a management mechanism 106, and one or more server devices 108A, 108B, . . . , 108N, which are collectively referred to as the server devices 108. The server device 108B is particularly described herein as representative of each server device 108.

The networking switch 104 is a programmable networking switch, and includes a networking switch processor 110. The networking switch 104 may be hardwired to the management mechanism 106 and to the server device 108B. The management mechanism 106 may also be referred to as a management module, and is the mechanism by which external management of the server device 108B occurs. The management mechanism 106 includes an enclosure processor 112

The server device 108B may be a blade server device that has the form factor of a card insertable into a corresponding slot of the enclosure 102. The server device 108B includes a management processor 114, such as a service management processor, by which the server device 108B is managed within the enclosure 102 through the management mechanism 106. The server device 108B also includes at least a host processor 116 and memory 118, among other hardware components. The host processor 116 and the memory 118, together with software, provide the functioning of the server device 108B for its intended purpose, and in this way the host processor 116 is separate and distinguished from the management processor 114.

The enclosure 102 exposes an external networking jack 120 connected to the networking switch 104. The external networking jack 120 connects the enclosure 102 to an external network 122. The network 122 may be or include one or more of an intranet, an extranet, the Internet, a wide-area network, a local-area network, a wired network, a wireless network, and so on.

A device 124, external to the enclosure 102, is also connected to the network 122. The device 124 may be a computing device, such as a laptop computer or a desktop computer, or another type of computing device. The device 124 may be used to manage the server device 108B via the management mechanism 106.

Three communication paths 126, 128, and 130 are depicted in FIG. 1. The communication path 126 is represented in FIG. 1 by an alternating dashed-and-dotted line. The communication path 128 is represented in FIG. 1 by a dashed line. The communication path 130 is represented in FIG. 1 by a dotted line.

The communication path 126 indicates how the management mechanism 106 communicates with the server device 108B internally within the enclosure 102 via the networking switch 104. The communication path 128 indicates how the device 124 communicates with the management mechanism 106, such as to manage the server device 108B, via the network 122 and the networking switch 104. The communication path 130 indicates how the device 124 communicates with the server device 108B via the network 122 and the networking switch 104.

The communication over the communication path 128 is generally communication of one type, whereas the communication over the communication path 130 is generally communication of another type. For instance, the communication over the communication path 128 may be high-bandwidth communication, such as communication having a specified and/or maximum bandwidth greater than a threshold. In this example, the communication over the communication path 130 may be low-bandwidth communication, such as communication having a specified and/or maximum bandwidth lower than this threshold.

Figure 2:
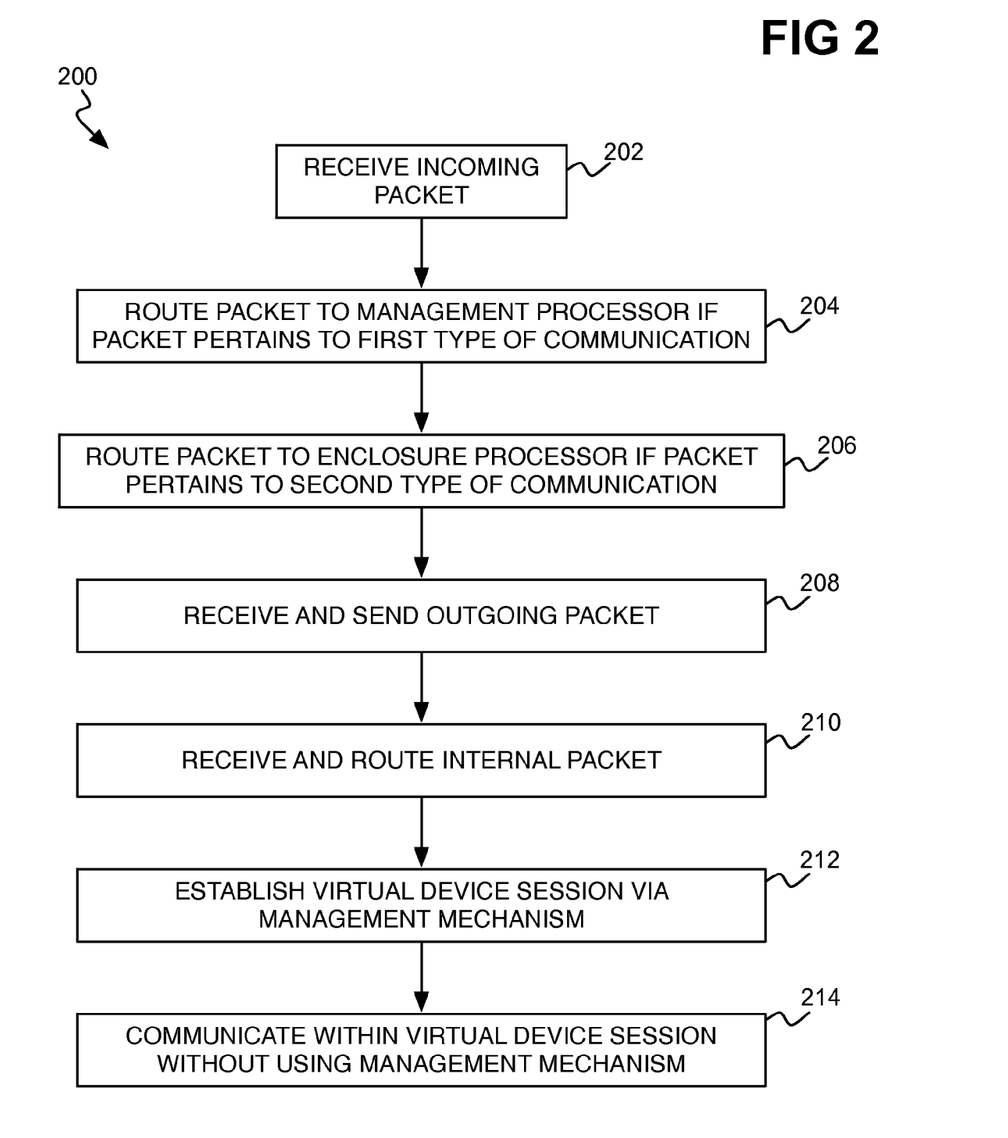
FIG. 2 is a flowchart of an example method by which communication is achieved within the example enclosure and the example system of FIG. 1.

FIG. 2 shows an example method 200 by which communication within the system 100, including the enclosure 102, occurs. An incoming packet is received by the networking switch processor 110 of the switch 104, via the interconnection of the enclosure 102 to the network 122 (202). For instance, the incoming packet may originate from the device 124 that is also connected to the network 122.

The incoming packet is addressed to a network address associated with the enclosure 102. The management mechanism 106 and the server device 108B share this network address. The network address may be an IP layer-three network address.

The networking switch processor 110 routes the incoming packet directly to the management processor 114 of the server device 108B if the packet pertains to a first type of communication (204). Such routing occurs without the packet passing through the management mechanism 106. The networking switch processor 110 routes the incoming packet to the enclosure processor 112 of the management mechanism 106 if the packet pertains to a different, second type of communication (206).

The packet itself may indicate the communication type to which it pertains. For instance, the packet can include a network port in addition to the network address associated with the enclosure 102. If the network port is a pre-specified network port, then the packet pertains to the first type of communication. Otherwise, if the network port is not the pre-specified network port, then the packet pertains to the second type of communication.

The networking switch processor 110 may receive and route an outgoing packet from the management mechanism 106 or the server device 108B, which can be a return packet responsive to the incoming packet received from the device 124 (208). As such, the networking switch processor 110 sends this outgoing packet to the network 122 to which the enclosure 102 is externally connected via the networking jack 120. Because the network address associated with the enclosure 102 is shared by both the management mechanism 106 and the server device 108B, the networking switch processor 110 does not have to modify or replace the source network address associated with this packet.

The networking switch processor 110 may further receive and route an internal packet from the management mechanism 106 to the server device 108B, or from the server device 108B to the management mechanism 106 (210). Because both the management mechanism 106 and the server device 108B share the same network address associated with the enclosure 102, such routing is achieved on a different, lower-level basis than the network level of this network address. For instance, the management mechanism 106 and the server device 108B can have different media-access controller (MAC) level-two network addresses by which such internal routing occurs.

Using parts 202, 204, 206, 208, and 210 of the method 200, a virtual device session can be established between the device 124 and the server device 108B, via the management mechanism 106 (212). For instance, the management mechanism 106 may first retrieve information regarding the capabilities and parameters of the server device 108B via the communication path 126. The device 124 may request a virtual device session to be established with the server device 108B by interacting with the management mechanism 106 via the communication path 128. The management mechanism 106 thus establishes the virtual device session between the device 124 and the server device 108B, based on the information regarding the capabilities and parameters that it had earlier retrieved from the server device 108B.

Thereafter, communication within the virtual device session occurs without involvement of the management mechanism 106 (214). Specifically, the device 124 and the server device 108B interact with one another via the communication path 130. The communication path 128 may thus be considered as a control or management communication path in which relatively low amounts of data are exchanged, whereas the communication path 130 may be considered as a data communication path in which relatively high amounts of data are exchanged.

To achieve the communication described in relation to the method 200, two different implementations are disclosed herein. As noted above, the enclosure 102 is associated with a network address that is shared by both the management mechanism 106 and the server device 108. This network address may be a higher-level address, such as an IP level-three network address.

In the first implementation, the management mechanism 106 and the server device 108B also share another network address, which may be a lower-level address, such as a MAC level-two network address. This permits the networking switch processor 110 to route incoming packets having both the higher-level address and this lower-level address to the server device 108B or to the management mechanism 106 without any modification of these packets. Likewise, this implementation permits the networking switch processor 110 to route outgoing packets having both these addresses from the server device 108B or from the management mechanism 106 onto the network 122 without any modification of these packets.

However, because both the management mechanism 106 and the server device 108B share both the lower-level address and the higher-level address, to realize the communication path 126 between the mechanism 106 and the device 108B, the server device 108B has an additional lower-level address. This additional lower-level address may be another MAC level-two network address. This additional lower-level address is unique to the server device 108B at least within the enclosure 102, as assigned to the management mechanism 106 or any other server device 108.

Therefore, the management mechanism 106 and the server device 108B communicate with one another using the unique lower-level address of the server device 108B. However, the server device 108B communicates externally (e.g., with the device 124) using the lower-level address that the device 108B shares with the management mechanism 106. The server device 108B thus has two lower-level addresses of the same type in this respect, although the lower-level address that it shares with the management mechanism 106 is hidden from the management mechanism 106.

Figure 3:
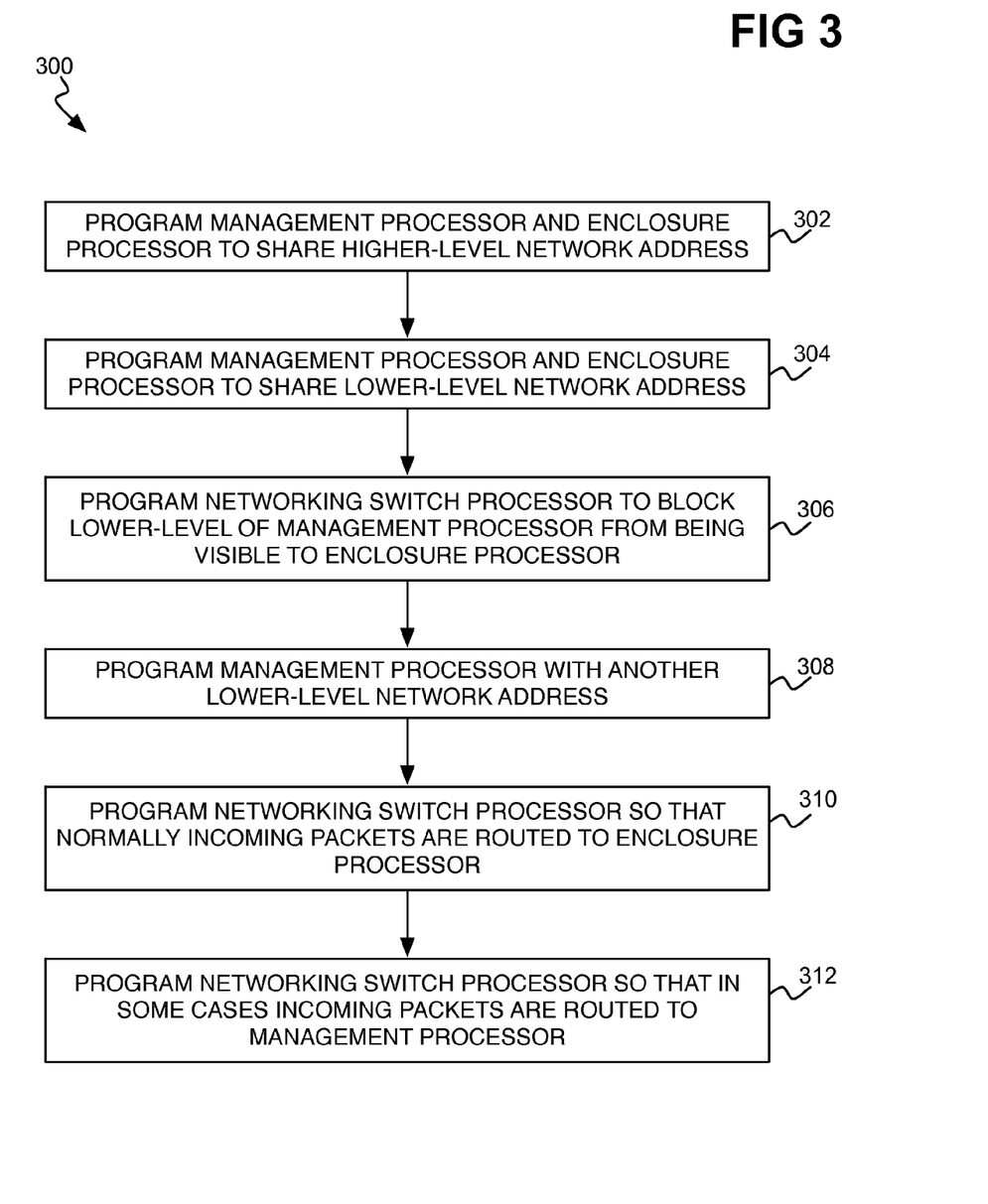
FIG. 3 is a flowchart of an example method by which the networking switch, the management mechanism, and the server devices of FIG. 1 can be programmed to realize the communication of FIG. 2.

FIG. 3 shows an example method 300 to realize the communication of the method 200 within the system 100 in accordance with this first implementation. The method 300 can be implemented as a computer program stored on a non-transitory computer-readable data storage medium. Execution of the computer program by one or more of the networking switch processor 110, the enclosure processor 112, and the management processor 114 results in performance of the method 300.

The management processor 114 and the enclosure processor 112 are programmed to share a higher-level network address associated with the enclosure 102 (302), such as an IP level-three network address. The management processor 114 and the enclosure processor 112 are also programmed to share a lower-level network address (304), such as a MAC level-two network address. However, the networking switch processor 110 is programmed to block this lower-level network address as associated with the management processor 114 from being visible to the enclosure processor 112 (306). Otherwise, the management processor 114 and the enclosure processor 112 may detect an error condition resulting from them sharing this lower-level address.

The management processor 114 is also programmed with another, different lower-level network address (308), such as another, different MAC level-two network address. As noted above, this additional lower-level network address associated with the management processor 114 permits the enclosure processor 112 and the management processor 114 to communicate with one another within the enclosure 102, via the networking switch 104. The management processor 114 thus has two lower-level network addresses of the same type.

The networking switch processor 110 is programmed so that normally incoming packets received through the networking jack 120 are routed to the enclosure processor 112 (310). The networking switch processor 110 is also programmed, however, so that in some cases such incoming packets are instead routed directly to the management processor 114 (312), without passing through the management mechanism 106 (i.e., through the enclosure processor 112). As noted above, for instance, incoming packets having a pre-specified network port may be routed to the management processor 114, and other incoming packets not having this port may be routed to the enclosure processor 112.

It is noted that the some types of the switch 104 may not be able to handle both the management processor 114 and the enclosure processor 112 sharing a lower-level network address, such as a MAC level-two network address. In some instances, the switch 104 may still operate in accordance with the methods 200 and 300, but may generate warnings of this duplication, which can simply be ignored. In other instances, however, the switch 104 may not operate normally, and instead block this network address, and/or one or more of the ports to which the server device 108B and the management mechanism 106 are connected.

In these latter instances, the switch 104 may be programmed or configured so that it does not attempt to learn the lower-level network addresses of the devices that are connected to the ports of the switch 104. As such, the switch 104 does not become aware that the management processor 114 and the enclosure processor 112 are sharing a lower-level network address. Such programming or configuration of the switch 104 thus permits the first implementation of the communication described in relation to the method 200 to be achieved in these instances, in accordance with the method 300.

In the second implementation to achieve the communication described in relation to the method 200, the management mechanism 106 and the server device 108B share just one network address, such as the higher-level network address associated with the enclosure 102, which may be an IP level-three network address. By comparison, the management mechanism 106 has a lower-level network address, such as a MAC level-two network address, and the server device 108B has a different lower-level network address, such as a different MAC level-two network address. This permits the networking switch processor 110 to route packets between the management mechanism 106 and the server device 108B within the communication path 130.

The enclosure 102 is associated with the lower-level network address of the management mechanism 106. Therefore, incoming network packets intended for the management mechanism 106, and outgoing network packets from the management mechanism 106, do have to be modified by the networking switch processor 110. By comparison, however, incoming networking packets intended for the server device 108B have their lower-level destination network address replaced by the lower-level network address of the device 108B prior to routing these packets to the server device 108B. Likewise, outgoing networking packets from the server device 108B have their lower-level source or origination network address replaced by the lower-level network address associated with the enclosure 102 prior to routing these packets onto the network 122.

Figure 4:
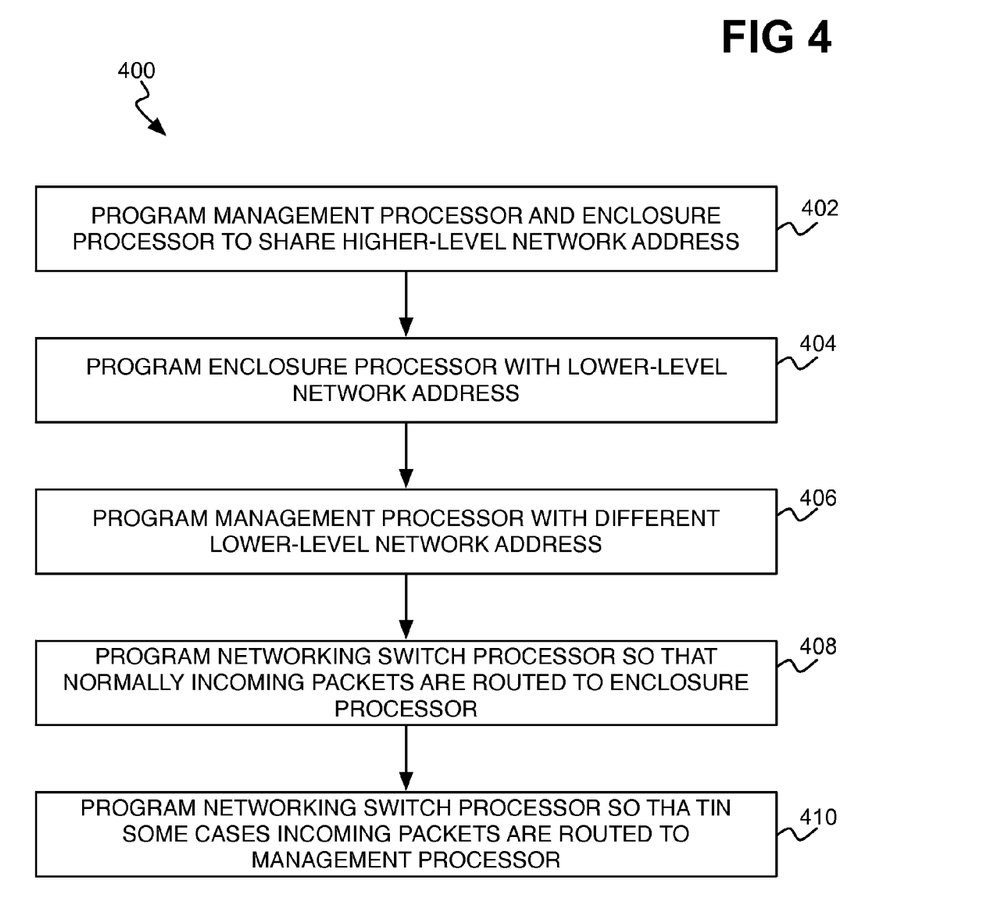
FIG. 4 is a flowchart of another example method by which the networking switch, the management mechanism, and the server devices of FIG. 1 can be programmed to realize the communication of FIG. 2.

FIG. 4 shows an example method 400 to realize the communication of the method 200 within the system 100 in accordance with this second implementation. Like the method 300, the method 400 can be implemented as a computer program stored on a non-transitory computer-readable data storage medium. Execution of the computer program by one or more of the networking switch processor 110, the enclosure processor 112, and the management processor 114 results in performance of the method 400.

The management processor 114 and the enclosure processor 112 are programmed to share a higher-level network address associated with the enclosure 102 (402), such as an IP level-three network address, as in part 302 of the method 300. The enclosure processor 112 is programmed with a lower-level network address (404), such as a MAC level-two network address. However, the management processor 114 is programmed with a different lower-level network address (406), such as a different MAC level-two network address. As such, the management processor 114 does not share a lower-level network address of this type with the enclosure processor 112 and can have just one lower-level network address in this second implementation, in contradistinction to the first implementation.

The networking switch processor 110 is programmed so that normally incoming packets received through the networking jack 120 are routed to the enclosure processor 112 (408), as in part 310 of the method 300. The networking switch processor 110 is also programmed so that in some cases incoming packets are instead routed directly to the management processor 114 (410), without passing through the management mechanism 106 (i.e., through the enclosure processor 112). As noted above in relation to parts 310 and 312 of the method 300, this can be achieved by comparing the network ports of such packets to a pre-specified network port, and correspondingly routing the packets on this basis to either the management processor 114 or to the enclosure processor 112.

As part of part 410, the networking switch processor 110 is programmed to replace the lower-level destination network address of the incoming packets—which is the lower-level network address associated with the enclosure 102—with the lower-level network address of the management processor 114. Likewise, the networking switch processor 110 is programmed in part 410 to replace the lower-level source or origination network address of outgoing packets from the management processor 114 with the lower-level network address associated with the enclosure 102. In this way, packets can be properly transmitted between the management processor 114 and the device 124 within the communication path 130.

In both the first and second implementations of the method 200, then, communication between the management mechanism 106 and the server device 108B occurs within the communication path 126 via use of lower-level network addresses. This is because the management mechanism 106 and the server device 108B share a higher-level network address. In the first implementation, the server device 108B shares a lower-level network address with the management mechanism 106, such that the networking switch processor 110 does not have to modify packets to or from the server device 108B within the communication path 130. This implementation therefore has the advantage of not having to perform such packet modification.

By comparison, in the second implementation, the server device 108B does not share a lower-level network address with the management mechanism 106. As such, the networking switch processor 110 does have to modify packets to or from the server device 108B within the communication path 130. However, this implementation has the advantage of not having to maintain multiple lower-level network addresses associated with the server device 108B and its management processor 114. Furthermore, this implementation does not have to accommodate the server device 108B having an identical lower-level network address to that of the management mechanism 106.

The communication types on which basis incoming packets are discerned as being part of the communication path 128 to the management mechanism 106 or part of the communication path 130 to the management mechanism 130 have been described herein as being distinguished on the basis of bandwidth. However, these communication types can be distinguished on other bases as well. Furthermore, distinguishing whether a packet is of the first communication type or the second communication type has been described herein as being achieved by the packets having different network ports associated with the different communication types. However, such distinction between can be achieved in different ways as well.

We claim:

1. A method comprising:
   receiving a packet addressed to a network address associated with an enclosure, by a networking switch processor of a networking switch within the enclosure, the networking switch connected to a server device within the enclosure and to a management mechanism within the enclosure;
   in response to determining that the packet pertains to first communication having a specified bandwidth greater than a threshold, routing the packet by the networking switch processor directly to a management processor of the server device without the packet passing through the management mechanism, the management mechanism separate from the server device that includes the management processor; and,
   in response to determining that the packet pertains to second communication having a specified bandwidth less than the threshold, routing the packet by the networking switch processor to an enclosure processor of the management mechanism,
   wherein the management processor and the enclosure processor share the network address associated with the enclosure, such that the network address is associated with the enclosure in that the management processor and the enclosure processor that are within the enclosure are associated with the network address,
   wherein a bandwidth of each of the first communication and the second communication is a throughput of data transfer thereof.

2. The method of claim 1, further comprising:
   determining, by the networking switch processor, that the packet pertains to the first communication by determining that the packet is addressed to a first network port; and,
   determining, by the networking switch processor, that the packet pertains to the second communication by determining that the packet is addressed to a second network port.

3. The method of claim 1, wherein the network address is a first network address at a first networking layer,
   wherein the management processor and the enclosure processor share a second network address at a second networking layer lower than the first networking layer,
   wherein the management processor further has a third network address at the second networking layer, the third network address unique within the enclosure in relation to the second networking layer, such that the management processor has two network addresses at the second networking layer,
   and wherein the packet is further addressed to the second network address at the second networking layer.

4. The method of claim 3, further comprising:
   communicating with the management processor through the networking switch, by the enclosure processor, using the third network address of the management processor.

5. The method of claim 1, wherein the network address is a first network address at a first networking layer,
   wherein the enclosure processor has a second network address at a second networking layer lower than the first networking layer,
   wherein the packet is further addressed to the second network address at the second networking layer,
   wherein the management processor has a third network address at the second networking layer, the third network address different than the second network address, such that the management processor does not share any network address at the second networking layer with the enclosure processor,
   and wherein routing the packet by the networking switch processor directly to the management processor of the server device comprises replacing the second network address within the packet with the third network address.

6. The method of claim 5, further comprising:
receiving a return packet by the networking switch processor from the management processor, the return packet including the first network address and the third network address; and,
replacing the third network address within the packet with the second network address, by the networking switch processor.

7. The method of claim 1, further comprising:
establishing a virtual device session between the server device and a client device external to the enclosure, by the management mechanism communicating with the client device through the networking switch via packets pertaining to the second communication; and,
after the virtual device session has been established, communicating by the server device with the client device within the virtual device session, via other packets pertaining to the second communication and that do not pass through the management mechanism.

8. An apparatus comprising:
an enclosure associated with a network address;
a server device within the enclosure and including a management processor;
a management mechanism within the enclosure and including an enclosure processor, the server device and the management device sharing the network address, such that the network address is associated with the enclosure in that the server device and the management mechanism that are within the enclosure are associated with the network address, the management mechanism separate from the server device that includes the management processor;
a networking switch within the enclosure communicatively connecting the server device and the management device and including a networking switch processor,
wherein the networking switch processor is to receive a packet addressed to the network address, is to route the packet directly to the management processor without the packet passing through the management mechanism where the packet pertains to a first communication type, and is to route the packet to the enclosure processor where the packet pertains to a second communication type.

9. The apparatus of claim 8, wherein the packet pertains to the first communication type where the packet is addressed to a first network port,
and wherein the packet pertains to the second communication type where the packet is addressed to a second network port.

10. The apparatus of claim 8, wherein the packet pertains to the first communication type where the packet pertains to first communication having a specified bandwidth greater than a threshold,
wherein the packet pertains to the second communication type where the packet pertains to second communication having a specified bandwidth less than the threshold,
and wherein a bandwidth of each of the first communication and the second communication is a throughput of data transfer thereof.

11. The apparatus of claim 8, wherein the network address is a first network address at a first networking layer,
wherein the management processor and the enclosure processor share a second network address at a second networking layer lower than the first networking layer,
wherein the management processor further has a third network address at the second networking layer, the third network address unique within the enclosure in relation to the second networking layer, such that the management processor has two network addresses at the second networking layer,
and wherein the packet is further addressed to the second network address at the second networking layer.

12. The method of claim 1, wherein the network address is a first network address at a first networking layer,
wherein the enclosure processor has a second network address at a second networking layer lower than the first networking layer,
wherein the packet is further addressed to the second network address at the second networking layer,
wherein the management processor has a third network address at the second networking layer, the third network address different than the second network address, such that the management processor does not share any network address at the second networking layer with the enclosure processor,
and wherein the networking switch processor is to route the packet directly to the management processor of the server device by replacing the second network address within the packet with the third network address.

13. A non-transitory computer-readable data storage medium to store a computer program executable by one or more of a networking switch processor of a networking switch within an enclosure, a management processor of a server device within the enclosure, and an enclosure processor of a management mechanism within the enclosure, wherein execution of the computer program causes a method to be performed, the method comprising:
programming the management processor and the enclosure processor to share a network address associated with the enclosure, such that the network address is associated with the enclosure in that the server device and the management mechanism that are within the enclosure are associated with the network address, the management mechanism separate from the server device that includes the management processor;
programming the networking switch processor so that normally a packet received at the enclosure is routed by the networking switch processor to the enclosure processor; and,
programming the networking switch processor so that where the packet is received at a pre-specified network port, the packet is instead routed by the networking switch processor directly to the management processor without the packet passing through the management mechanism.

14. The non-transitory computer-readable data storage medium of claim 13, wherein the network address is a first network address at a first networking layer, wherein the method further comprises:
programming the management processor and the enclosure processor to share a second network address at a second networking layer lower than the first networking layer;
programming the networking switch processor to block the second network address of the management processor from being visible to the enclosure processor;
programming the management processor with a third network address at the second networking layer, the third network address unique within the enclosure in relation to the second networking layer, such that the management processor has two network addresses at the second networking layer, and such that the enclosure processor is to communicate with the management processor via the third network address of the management processor, and wherein the packet is further addressed to the second network address at the second networking layer.

15. The non-transitory computer-readable data storage medium of claim 13, wherein the network address is a first network address at a first networking layer, wherein the method further comprises:

programming the enclosure processor with a second network address at a second networking layer lower than the first networking layer, the packet further addressed to the second network address at the second networking layer;

programming the management processor with a third network address at the second networking layer, the third network address different than the second network address, such that the management processor does not share any network address at the second networking layer with the enclosure processor, programming the networking switch processor so that where the packet is received at the pre-specified network port, the second network address within the packet is replaced with the third network address.

* * * * *